(12) United States Patent
Syu

(10) Patent No.: US 8,090,899 B1
(45) Date of Patent: Jan. 3, 2012

(54) SOLID STATE DRIVE POWER SAFE WEAR-LEVELING

(75) Inventor: Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 497 days.

(21) Appl. No.: 12/398,093

(22) Filed: Mar. 4, 2009

(51) Int. Cl.
*G06F 13/00* (2006.01)

(52) U.S. Cl. .................. 711/103; 711/156; 711/166

(58) Field of Classification Search .................. 711/103, 711/156, 166
See application file for complete search history.

(56) References Cited

U.S. PATENT DOCUMENTS

| | | | |
|---|---|---|---|
| 6,000,006 A * | 12/1999 | Bruce et al. ................ | 711/103 |
| 6,081,447 A | 6/2000 | Lofgren et al. | |
| 6,230,233 B1 | 5/2001 | Lofgren et al. | |
| 6,429,984 B1 | 8/2002 | Alex | |
| 6,594,183 B1 | 7/2003 | Lofgren et al. | |
| 6,850,443 B2 | 2/2005 | Lofgren et al. | |
| 6,901,499 B2 | 5/2005 | Aasheim et al. | |
| 7,080,232 B2 | 7/2006 | Aasheim et al. | |
| 7,120,729 B2 | 10/2006 | Gonzalez et al. | |
| 7,178,061 B2 | 2/2007 | Aasheim et al. | |
| 7,340,647 B2 | 3/2008 | Aasheim et al. | |
| 7,350,105 B2 | 3/2008 | Aasheim et al. | |
| 7,397,707 B2 | 7/2008 | Mokhlesi | |
| 2007/0204128 A1 | 8/2007 | Lee et al. | |
| 2008/0034153 A1 * | 2/2008 | Lee et al. ................ | 711/103 |
| 2008/0235443 A1 * | 9/2008 | Chow et al. ............... | 711/103 |
| 2009/0122949 A1 * | 5/2009 | Reid et al. ................ | 377/15 |

* cited by examiner

*Primary Examiner* — Reba I Elmore

(57) ABSTRACT

A solid state drive includes a plurality of flash memory devices, and a memory controller coupled to the plurality of flash memory devices. The memory controller is configured to logically associate blocks from the plurality of flash memory devices to form zip codes, the zip codes associated with corresponding erase counters. The solid state drive further includes a processor and a computer-readable memory having instructions stored thereon. The processor may perform a wear-leveling operation by determining that blocks in a first zip code have been erased and incrementing a first erase counter associated with the first zip code. It may then be determined that a second erase counter associated with a second zip code is low relative to at least one other erase counter, and based on this determination, data from blocks in the second zip code may be written to new blocks as part of a wear-leveling operation.

34 Claims, 7 Drawing Sheets

SOLID STATE DRIVE POWER SAFE WEAR-LEVELING

BACKGROUND

In a variety of consumer electronics, solid state drives are more and more frequently replacing conventional rotating hard disk drives for mass storage. These solid state drives may include one or more flash memory devices, the flash memory devices may be logically divided into blocks, and each of the blocks may be further logically divided into addressable pages. These addressable pages may be any of a variety of sizes (e.g., 512 Byte, 1 Kilobyte, 2 Kilobytes, 4 Kilobytes), which may or may not match the logical block address sizes used by a host computing device.

During a write operation, data may be written to the individual addressable pages in a block of a flash memory device. However, in order to erase or rewrite a page, an entire block must typically be erased. Of course, different blocks in each flash memory device may be erased more or less frequently depending upon the data stored therein. Thus, since the lifetime of storage cells of a flash memory device correlates with the number of erase cycles, many solid state drives perform wear-leveling operations (both static and dynamic) in order to spread erasures more evenly over all of the blocks of a flash memory device.

During a static wear-leveling operation, data in a source block that has been relatively infrequently erased may be moved to a target block, such that new data may be recorded to the source block, which may then be erased more frequently. Unfortunately, in conventional solid state drives, if power is lost during the static wear-leveling operation, data being moved from the source block to the target block may be lost. In some solid state drives, this data loss may be unrecoverable. In other solid state drives, the data may remain in the source block, but the entire move operation must be started from the beginning if the solid state drive experiences a power failure.

There is therefore a need in the art to improve wear-leveling operations in solid state drives.

DETAILED DESCRIPTION

Figure 1:
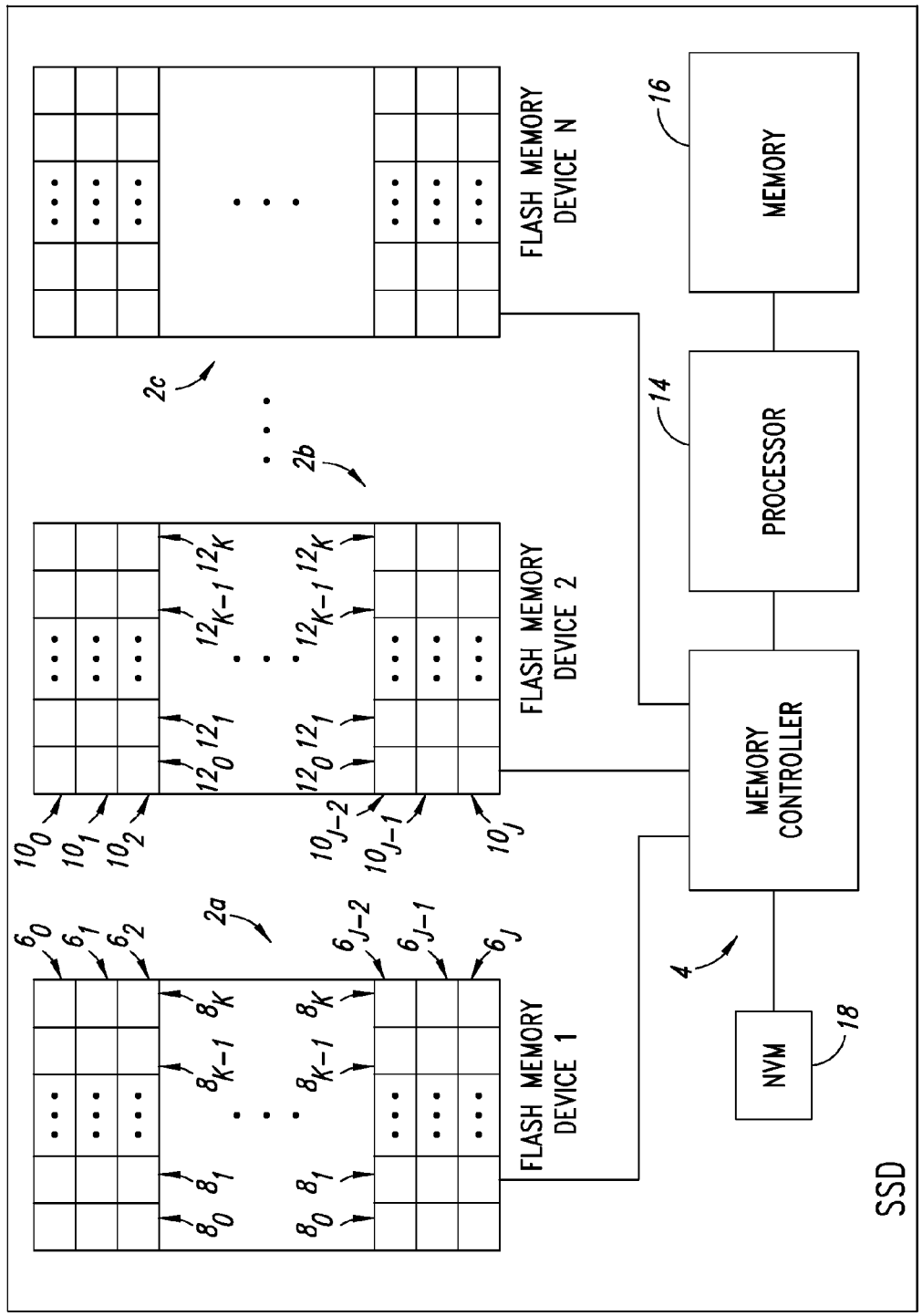
FIG. 1 is a schematic view generally illustrating an example solid state drive incorporating a plurality of flash memory devices, according to one illustrated embodiment.

Referring to FIG. 1, according to one embodiment, solid state drive (SSD) 1 comprises a first flash memory device $2a$, a second flash memory device $2b$ and a memory controller 4 coupled to the first flash memory device $2a$ and the second flash memory device $2b$. The first flash memory device $2a$ is logically divided into a first plurality of blocks $6_{0-j}$ (collectively 6, illustrated as horizontal rows), each of the first plurality of blocks 6 being logically divided into addressable pages $8_{0-k}$ (collectively 8, delineated by the vertical lines running through the rows). Similarly, the second flash memory device $2b$ is logically divided into a second plurality of blocks $10_{0-j}$ (collectively 10, illustrated as horizontal rows), each of the second plurality of blocks 10 being logically divided into addressable pages $12_{0-k}$ (collectively 12, delineated by the vertical lines running through the rows). The memory controller 4 may be configured to logically associate a first block (e.g., block $6_0$) of the first plurality of blocks 6 with a second block (e.g., block $10_0$) of the second plurality of blocks 10 to form a first zip code, the first zip code associated with a first erase counter. The memory controller 4 may be further configured to logically associate a first source block (e.g., block $6_1$) of the first plurality of blocks 6 with a second source block (e.g., block $10_1$) of the second plurality of blocks 10 to form a second zip code, the second zip code associated with a second erase counter. The SSD 1 further comprises a processor 14 coupled to the memory controller 4 and operable to execute instructions, and a computer-readable memory 16 having instructions stored thereon that are executable by the processor 14 in order to cause the processor 14 to perform a wear-leveling operation, by: determining that the first block $6_0$ and the second block $10_0$ in the first zip code have been erased; based at least in part on the determination, incrementing the first erase counter associated with the first zip code; after incrementing the first erase counter, determining that the second erase counter associated with the second zip code is low relative to at least one other erase counter; and based at least in part on determining that the second erase counter is low, writing data from the first source block $6_1$ and the second source block $10_1$ in the second zip code to a first target block (e.g., block $6_2$) of the first plurality of blocks 6 and a second target block (e.g., block $10_2$) of the second plurality of blocks 10 as part of the wear-leveling operation.

As illustrated herein, the SSD 1 comprises a drive including N flash memory devices 2 coupled to a single memory controller 4. In one embodiment, the solid state drive 1 may include just two flash memory devices $2a, b$. In other embodiments, the solid state drive 1 may include three or more flash memory devices 2, as illustrated.

The flash memory devices 2 may comprise any of a variety of types of Electrically Erasable Programmable Read-Only Memory (EEPROM) flash memory. In one embodiment, each flash memory device 2 comprises NAND multi-level cell (MLC) flash. In another embodiment, NOR and/or single-level cell (SLC) flash memory devices may be used. Each flash memory device 2 may include a distinct input/output port (not illustrated) configured to send and receive user data to and from the memory controller 4. In some embodiments, the flash memory devices 2 may support internal data copies, such that circuitry within the flash memory devices 2 is operable to copy data from one page to another without sending and receiving data via its I/O port. However, in other embodiments, the flash memory devices 2 may not support such functionality.

As illustrated, data storage in the first flash memory device $2a$ is logically divided into the first plurality of blocks 6, which may be further logically divided into a plurality of addressable pages 8. In one embodiment, the pages 8 represent uniquely addressable locations for data that may be accessed by the memory controller 4, via a corresponding physical block address (PBA). The memory controller 4 may access these pages 8 via the PBAs and may be configured to map logical block addresses (LBAs) received from a host computing device to one or more corresponding PBAs. The pages 8 may hold different amounts of user data in different implementations, such as 512 Bytes, 1 Kilobyte, 2 Kilobytes, 4 Kilobytes, etc. In different embodiments, each block 6 may comprise more or fewer addressable pages 8.

In one embodiment, each block 6 may be associated with a block identifier, and the blocks 6 may represent indivisible erase units within the first flash memory device 2a. That is, in order to erase any page 8 within a block 6, the entire block 6 must be erased. As a result, in some embodiments, when a command from a host computing device indicates that a single page (e.g., page $8_k$ of block $6_{j-2}$) should be erased, the memory controller 4 may simply re-map the LBA associated with that page $8_k$ to a new addressable page (e.g., to page $8_1$ of block $6_{j-1}$). In such an embodiment, a block 6 may be erased only when none of the pages 8 within that block 6 are mapped to a current LBA. Of course, in other embodiments, other algorithms for erasing blocks 6 may be used. Although referred to as a "logical" division, in some embodiments, the boundaries between blocks 6 within the first flash memory device 2a may be associated with physical divisions in the device circuitry, and, similarly, the boundaries between addressable pages 8 within the blocks 6 may also be associated with physical divisions. In different embodiments, the first flash memory device 2a may comprise more or fewer blocks 6

In one embodiment, the second flash memory device 2b, and its second plurality of blocks 10 and corresponding addressable pages 12 may be arranged and configured similarly to those of the first flash memory device 2a. In one embodiment, they may be identically configured. Of course, in other embodiments, different flash memory devices may be used within the same SSD 1.

The memory controller 4 may be coupled to a plurality of flash memory devices 2 and may be configured to read from and write to these flash memory devices 2. In one embodiment, the memory controller 4 may be configured to maintain a PBA-LBA mapping table. For example, the solid state drive 1 may include at least one other non-volatile memory (NVM) 18 coupled to the memory controller 4 and configured to store the mapping table, as well as other information used by the memory controller 4. In one embodiment, this NVM 18 is not used to store user data, is not addressable by a host computing device and is logically separate from the flash memory devices 2 available for user data storage. In other embodiments, the mapping table and other system data may be stored in other memory of the SSD 1 (e.g., in the flash memory devices 2).

In one embodiment, the memory controller 4 may be further configured to logically associate a first block $6_0$ of the first plurality of blocks 6 with a second block $10_0$ of the second plurality of blocks 10 to form a first zip code, the first zip code associated with a first erase counter. The memory controller 4 may be further configured to logically associate a first source block $6_1$ of the first plurality of blocks 6 with a second source block $10_1$ of the second plurality of blocks 10 to form a second zip code, the second zip code associated with a second erase counter. Indeed, in one embodiment, a plurality of zip codes may be formed by the memory controller 4 to include at least one block from every flash memory device 2 in the solid state drive 1. In some embodiments, each zip code may include exactly one block from every flash memory device 2. The memory controller 4 may thus be configured to form as many zip codes as there are blocks in a single flash memory device 2, and each of these zip codes may be associated with a unique erase counter. For example, in one embodiment, the memory controller 4 may logically associate block $6_0$ and block $10_0$ in a first zip code, block $6_1$ and block $10_1$ in a second zip code, block $6_2$ and block $10_2$ in a third zip code, and so on through block $6_j$ and block $10_j$ in a jth zip code. In one embodiment, each zip code may be associated with a unique zip code identifier, and the composition of each zip code may be stored in the NVM 18 (or in other memory locations in the SSD 1) along with the zip code identifier. Corresponding erase counters for the zip codes may be stored in the NVM 18 or other memory locations as well.

In one embodiment, the memory controller 4 may operate such that only a complete zip code may be erased. That is, while blocks may be indivisible erase units for each flash memory device 2, the zip code may comprise the indivisible erase unit for the SSD 1. Thus, in one embodiment, a complete zip code may only be erased when none of the addressable pages in any of the blocks comprising the zip code is associated with a current LBA. The erase counter associated with a zip code may be incremented when all of the blocks in the zip code are erased. In other embodiments, other algorithms for incrementing the erase counters may be used. For example, an erase counter may be incremented when one or more blocks in a zip code are erased (e.g., in an embodiment in which the zip code is not an indivisible unit for erase operations).

The memory controller 4 may write user data to the blocks comprising a zip code in different ways. In one embodiment, the memory controller 4 may receive data associated with a sequence of LBAs and write: data from a first LBA to a first page $8_0$ of the first block $6_0$, data from a second consecutive LBA to a first page $12_0$ of the second block $10_0$, data in a third consecutive LBA to yet another flash memory device 2c and so forth. The memory controller 4 may cause this data to be written to the flash memory devices 2 substantially concurrently. In such an embodiment, data may be written to the flash memory devices 2 quite rapidly, exploiting the parallel architecture to avoid bottlenecks associated with writing to a single flash memory device 2. In other embodiments, data associated with a sequence of LBAs may be written to a sequence of pages in the same flash memory device 2.

The solid state drive 1 may further include a processor 14 coupled to the memory controller 4 and operable to execute one or more instructions in order to control certain operations performed by the SSD 1. In one embodiment, the processor 14 may comprise part of a SSD controller and may be configured to execute computer-readable instructions stored on computer-readable memory 16.

The memory 16 may comprise any type of volatile or non-volatile computer-readable memory, such as dynamic random access memory (DRAM) or flash memory. As illustrated, the memory 16 comprises a memory module separate and distinct from the flash memory devices 2. This memory 16 may or may not be distinct from the NVM 18. In some embodiments, various instructions executable by the processor 14 may be stored on the flash memory devices 2 or in the NVM 18 before being loaded into the memory 16 for execution.

In one embodiment, the memory 16 may have instructions stored thereon that are executable by the processor 14 in order to cause the processor 14 to perform a wear-leveling operation. The instructions may cause the processor 14 to determine that the first block $6_0$ and the second block $10_0$ in the first zip code have been erased, and based at least in part on the determination, increment the first erase counter associated with the first zip code. In one embodiment, the first block $6_0$ and the second block $10_0$ may be erased based upon one or more commands from the memory controller 4. For example, the memory controller 4 and/or the processor 14 may determine that no current LBAs are associated with any of the blocks of the first zip code (including the first block $6_0$ and the second block $10_0$), and the first zip code may then be erased. The processor 14 may then determine that the first zip code has been erased, and, based at least in part on the determination, increment the first erase counter associated with the first zip code. In other embodiments, only a subset of the blocks making up the first zip code may be erased, and the first erase counter may be updated based upon the erasure of just this subset of blocks.

After incrementing the first erase counter, the processor 14 may determine that a second erase counter associated with a second zip code is low relative to at least one other erase counter. As described above, this second zip code may, for example, include a first source block $6_1$ and a second source block $10_1$. In one embodiment, whenever an erase counter is incremented, the erase counters of all of the zip codes may be checked in order to determine whether there are any zip codes that have a relatively low erase counter. In other embodiments, only the erase counters of certain zip codes may be checked.

In one embodiment, in order to determine whether or not the second erase counter is relatively low, the second erase counter may be compared against the first erase counter. For example, after incrementing the first erase counter, it may be compared against every other erase counter, including the second erase counter. If the first and second erase counters differ by some amount (e.g., an absolute difference or a percentage difference), then it may be determined that the second erase counter is low relative to at least one other erase counter (i.e., the first erase counter). In another embodiment, the second erase counter may be compared against an average (e.g., a median, mean or mode) of two or more erase counters. For example, in one embodiment, each time an erase counter is incremented, a new average of all of the erase counters may be calculated by the processor 14, and it may then be determined if there are any relatively low erase counters. For example, if the second erase counter and the new average differ by some amount (e.g., an absolute difference or a percentage difference), then it may be determined that the second erase counter is low relative to at least one other counter (i.e., an average of all of the erase counters). In other embodiments, other algorithms for determining whether or not the second erase counter is relatively low may be employed. In addition, it may be determined that more than one erase counter is relatively low. For example, upon incrementing the first erase counter, it may be determined that five erase counters are relatively low, including the second erase counter.

Based at least in part on determining that the second erase counter is low, data may be written from the first source block $6_1$ and the second source block $10_1$ in the second zip code to a first target block $6_2$ of the first plurality of blocks 6 and a second target block $10_2$ of the second plurality of blocks 10 as part of a wear-leveling operation. In one embodiment, data from the second zip code may thus be moved to a third zip code including the target blocks $6_2$, $10_2$, as part of the wear-leveling operation. The third zip code may comprise any blocks of the first and second plurality of blocks 6, 10, and need not be adjacent the second zip code as illustrated. In another embodiment, data from the second zip code may be moved to blocks associated with multiple zip codes.

In one embodiment, firmware loaded onto the memory 16 may include a collector module for managing and monitoring the erase counters, a scheduler module configured to schedule static wear-leveling operations, and a refresher module configured to perform the static wear-leveling operations. In one embodiment, the processor 14, executing the collector module, may increment the first erase counter, determine that the second erase counter is relatively low, and set a flag to inform the scheduler module to schedule a wear-leveling operation for the second zip code. The processor 14, executing the scheduler module, may then set the appropriate parameters, and, at an appropriate time (e.g., when the SSD 1 is receiving relatively few host commands), may cause the processor 14, executing the refresher module, to perform the wear-leveling operation. As described above, data from the source blocks $6_1$, $10_1$ may then be written to the target blocks $6_2$, $10_2$. In other embodiments, any of a variety of firmware architectures may be used in order to manage the above-described wear-leveling operations.

Different wear-leveling algorithms for moving data from the source blocks $6_1$, $10_1$ to the target blocks $6_2$, $10_2$ may be implemented. In one embodiment, all of the data in the source blocks $6_1$, $10_1$ may be copied to the target blocks $6_2$, $10_2$, and then the source blocks $6_1$, $10_1$ may be erased. One exemplary algorithm for a wear-leveling operation will be discussed at greater length below.

Figure 2:
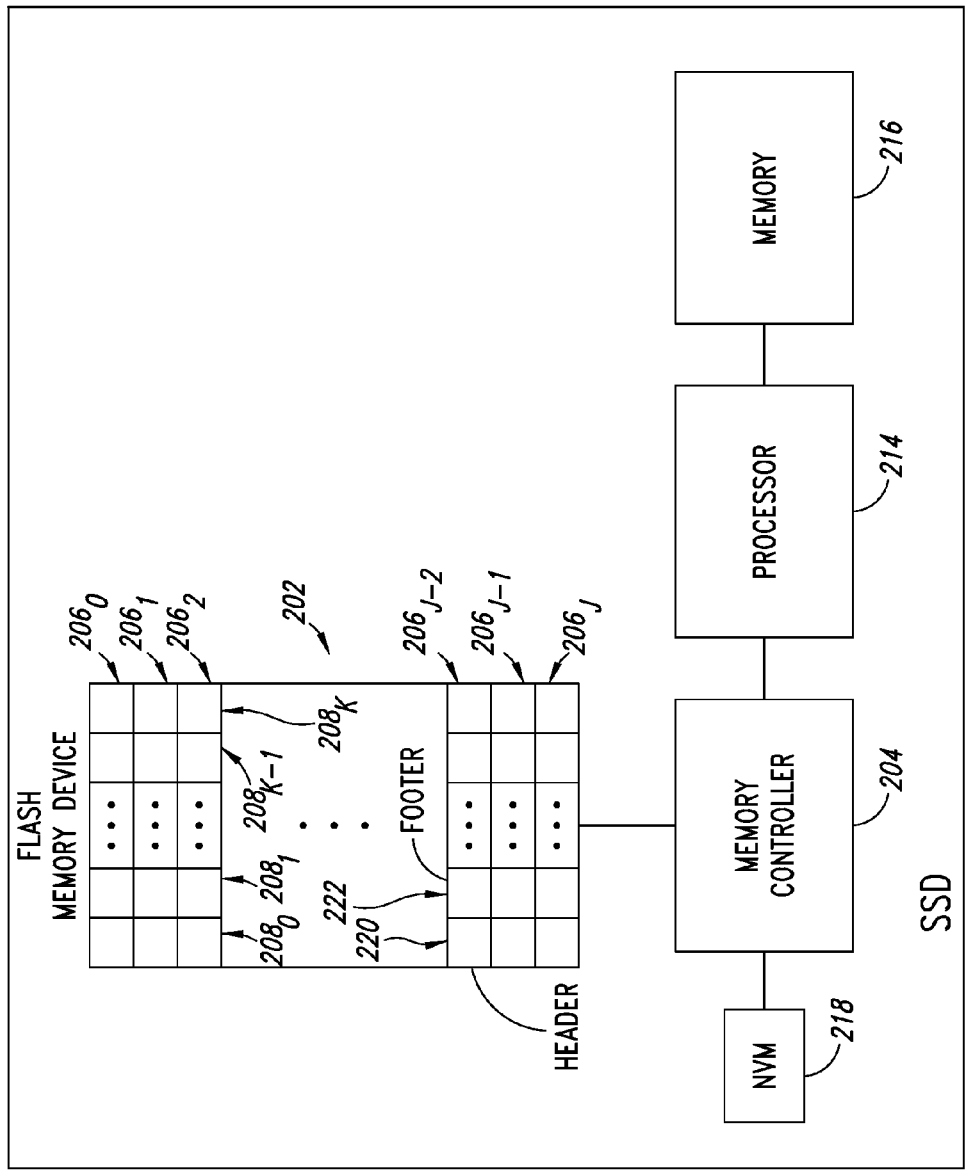
FIG. 2 is a schematic view illustrating another example solid state drive incorporating a single flash memory device, according to one illustrated embodiment.

Referring to FIG. 2, according to another embodiment, solid state drive 201 comprises a flash memory device 202 and a memory controller 204 coupled to the flash memory device 202. The flash memory device 202 is logically divided into a plurality of blocks $206_{0-j}$ (collectively 206, illustrated as horizontal rows), each of the plurality of blocks 206 being logically divided into addressable pages $208_{0-k}$ (collectively 208, delineated by the vertical lines running through the rows). The SSD 201 may further comprise a processor 214 coupled to the memory controller 204 and operable to execute instructions, and a computer-readable memory 216 having instructions stored thereon that are executable by the processor 214 in order to cause the processor 214 to perform a wear-leveling operation, by: determining that an erase counter associated with a source block (e.g., block $206_0$) of the plurality of blocks 206 is low relative to at least one other erase counter; based at least in part on the determination, writing a header 220 to the flash memory device 202, the header 220 including information indicative of the source block $206_0$ and a target block (e.g., block $206_1$) of the plurality of blocks 206; based at least in part on the determination, writing data from the source block $206_0$ to the target block $206_1$ as part of the wear-leveling operation; suspending the wear-leveling operation; and based at least in part on suspending the wear-leveling operation, writing a footer 222 to the flash memory device 202, the footer 222 including information indicative of progress made on the wear-leveling operation prior to the suspension.

The SSD 201 may be configured generally similarly to the SSD 1 described at length above. In one embodiment, the SSD 201 may comprise just a single flash memory device 202. However, in other embodiments, the SSD 201 may include two or more flash memory devices, and may include a single memory controller coupled to all of these flash memory devices.

In one embodiment, as described above, the memory controller 204 may be coupled to the flash memory device 202 and may be configured to read from and write to this device. The memory controller 204 may be further configured to maintain a PBA-LBA mapping table. For example, the SSD 201 may include at least one other non-volatile memory (NVM) 218 coupled to the memory controller 204 and configured to store the mapping table, as well as other information used by the memory controller 204. In other embodiments, the mapping table and other system data may be stored in other memory of the SSD 201 (e.g., in the flash memory device 202).

In one embodiment, each of the blocks 206 may be associated with a unique erase counter, such that when a block 206 is erased, a corresponding erase counter is incremented. In other embodiments, the SSD 201 may include multiple flash memory devices, and erase counters associated with zip codes may be maintained.

The computer-readable memory 216 may have instructions stored thereon that are executable by the processor 214 in order to cause the processor 214 to perform a wear-leveling operation. The instructions may cause the processor 214 to determine that an erase counter associated with a source block $206_0$ is low relative to at least one other erase counter. In one embodiment, the erase counter may be associated just with the source block $206_0$. In another embodiment, the erase counter may be associated with a zip code including the source block $206_0$, as described above with respect to the SSD 1. In one embodiment, whenever an erase counter is incremented, all of the erase counters may be checked in order to determine whether there are any blocks associated with a relatively low erase counter. In other embodiments, only the erase counters of certain blocks may be checked. In yet another embodiment, the erase counter associated with the source block $206_0$ may be checked upon some other triggering event.

In one embodiment, in order to determine whether or not the erase counter is relatively low, the erase counter may be compared against one other erase counter. For example, after incrementing a second erase counter associated with another block 206, the second erase counter may be compared against every other erase counter, including the erase counter associated with the source block $206_0$. If these erase counters differ by some amount (e.g., an absolute difference or a percentage difference), then it may be determined that the erase counter associated with the source block $206_0$ is relatively low. In another embodiment, the erase counter may be compared against an average (e.g., a median, mean or mode) of two or more erase counters. For example, in one embodiment, each time an erase counter is incremented, a new average of all of the erase counters may be calculated by the processor 214, and it may then be determined if there are any relatively low erase counters. For example, if the erase counter and the new average differ by some amount (e.g., an absolute difference or a percentage difference), then it may be determined that the erase counter associated with the source block $206_0$ is relatively low. In other embodiments, other algorithms for determining whether or not the erase counter is relatively low may be employed. In addition, it may be determined that more than one erase counter is relatively low.

Based at least in part on the determination that the erase counter associated with the source block $206_0$ is relatively low, a header 220 may be written to the flash memory device 202, the header 220 including information indicative of the source block $206_0$ and a target block $206_1$. As described below, the target block $206_1$ may represent the block to which the data currently in the source block $206_0$ will be moved in the static wear-leveling operation. The header 220 may be written immediately before the wear-leveling operation begins, although, in other embodiments, the header 220 may be written at another time relative to the wear-leveling operation. The header 220 may also include a variety of information associated with the wear-leveling operation. As illustrated, the header 220 may fill approximately one addressable page 208. However, in other embodiments, the header 220 may fill multiple pages 208.

In one embodiment, the header 220 may be written to a designated "warehouse" block (e.g., block $206_{j-2}$), which may comprise any of a number of blocks 206 in the flash memory device 202. In other embodiments, if the SSD 201 includes multiple flash memory devices, the header 220 may be written one or more times to a "warehouse" zip code. For example, multiple, duplicate headers 220 may be written to multiple flash memory devices in blocks comprising a single warehouse zip code. Information indicative of the current warehouse block or zip code may be stored in the NVM 218, such that the processor 214 may easily determine where to look for current header information. Indeed, in one embodiment, the warehouse blocks/zip codes may also be subject to wear-leveling operations, and thus the physical location of the current warehouse block/zip code may change.

Based at least in part on the determination that the erase counter is low, data may be written from the source block $206_0$ to the target block $206_1$ as part of the wear-leveling operation. Different wear-leveling algorithms for moving data from the source block $206_0$ to the target block $206_1$ may be implemented, as discussed at greater length below. In one embodiment, all of the data in the source block $206_0$ may be copied to the target block $206_1$, and then the source block $206_0$ may be erased.

In one embodiment, the wear-leveling operation is suspended before it has been completed. Any of a number of events may trigger such a suspension. In one embodiment, for example, a host command may be received by the SSD 201, and the wear-leveling operation may be suspended in order to respond appropriately to the host command. In another embodiment, a request to normally shut-down the SSD 201 may be received, and the wear-leveling operation may be suspended. In other embodiments, other events may interrupt the wear-leveling operation.

Based at least in part on suspending the wear-leveling operation, the processor 214 may write a footer 222 to the flash memory device 202, the footer 222 including information indicative of progress made on the wear-leveling operation prior to the suspension. The footer 222 may be associated with a single wear-leveling operation and may include a variety of information associated with that wear-leveling operation. For example, the footer 222 may include information indicative of the last page successfully copied from the source block $206_0$ to the target block $206_1$. Thus, in one embodiment, when the wear-leveling operation is resumed, the footer 222 may enable the processor 214 to resume the wear-leveling operation near where it left off. As illustrated, the footer 222 may fill approximately one addressable page 208. However, in other embodiments, the footer 222 may fill multiple pages.

In one embodiment, the footer 222 may be written to a "warehouse" block (e.g., block $206_{j-2}$), which may be the same as or different than the warehouse block to which the header 220 is written. In other embodiments, if the SSD 201 includes multiple flash memory devices, the footer 222 may be written one or more times to a "warehouse" zip code. For example, multiple, duplicate footers 222 may be written to multiple flash memory devices in blocks comprising a single warehouse zip code. Information indicative of the current warehouse block or zip code may be stored in the NVM 218, such that the processor 214 may easily determine where to look for current footer information.

Figure 3:
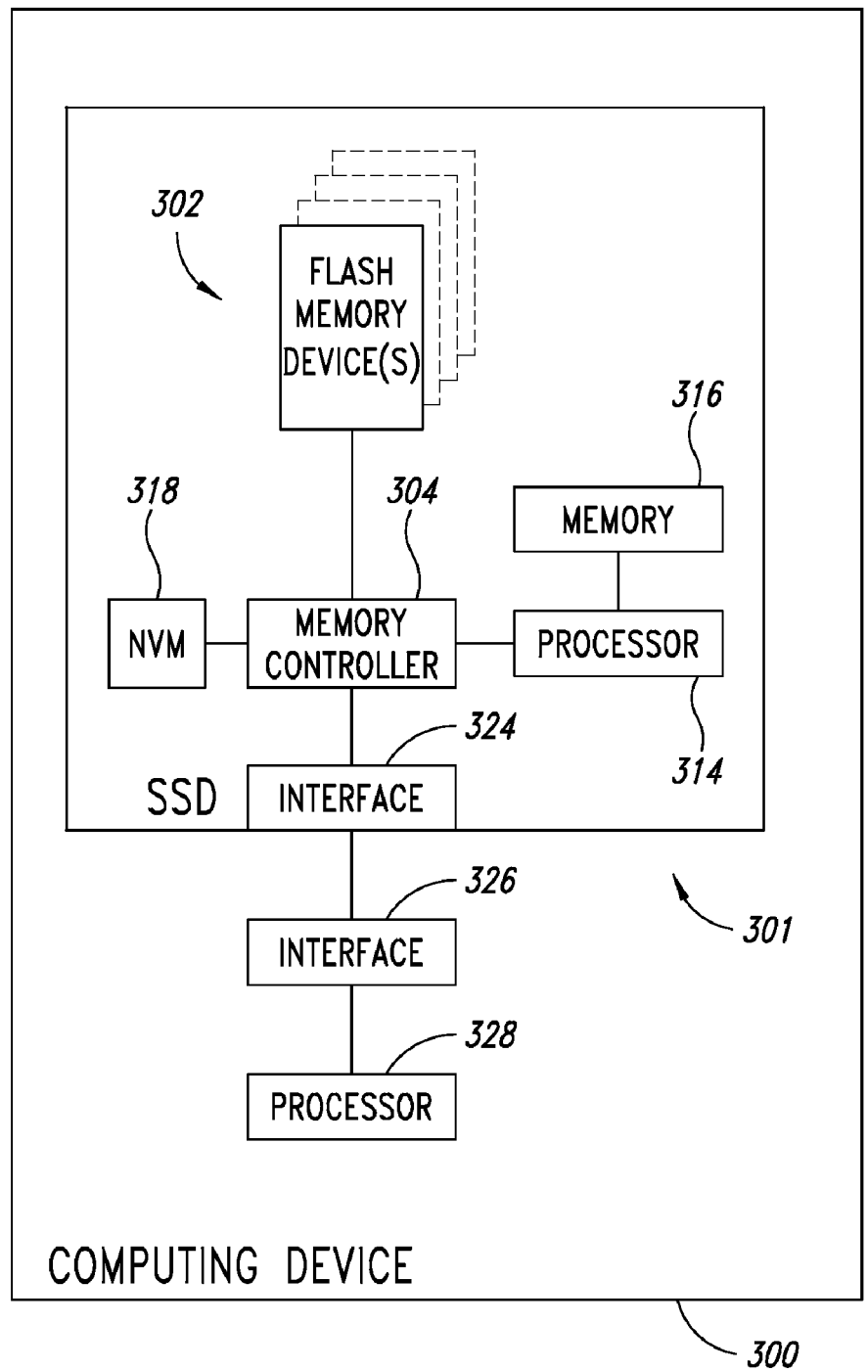
FIG. 3 is a schematic view illustrating an example solid state drive within a computing device, according to one illustrated embodiment.

FIG. 3 illustrates another example solid state drive 301 coupled to a host computing device 300. The SSD 301 may be configured generally similarly to the SSD 1 or SSD 201 described at length above, with like numerals referring to like parts. In one embodiment, the SSD 301 may comprise a single flash memory device 302. However, in other embodiments, the SSD 301 may include two or more flash memory devices 302, and may include a single memory controller 304 coupled to all of these flash memory devices 302.

The SSD 301 may include a host interface 324 configured to receive data access commands from the computing device 300 coupled to the SSD 301. The host interface 324 may also receive a variety of other commands and data from and transmit status and data to the computing device 300. The computing device 300 may include a corresponding SSD interface 326 configured to exchange information with the SSD 301 via the host interface 324. The host interface 324 and the SSD interface 326 may comply with any of a number of electrical engineering standards. In one embodiment, these interfaces 324, 326 may comprise serial interfaces, such as a Serial Advanced Technology Attachment ("SATA") interface or a Serial Attached Small Computer System Interface ("SAS"). In another embodiment, parallel interfaces may be used, such as an Advanced Technology Attachment/Integrated Drive Electronics ("ATA/IDE") interface or a Small Computer System Interface ("SCSI"). In yet another embodiment, the host interface 324 and the SSD interface 326 may comprise Peripheral Component Interconnect ("PCI") bus interfaces.

The host computing device 300 may comprise any of a variety of computing devices including at least one processor 328. The computing device 300 may comprise, for example, a personal computer, a server computing system, or a personal media device.

Figure 4:
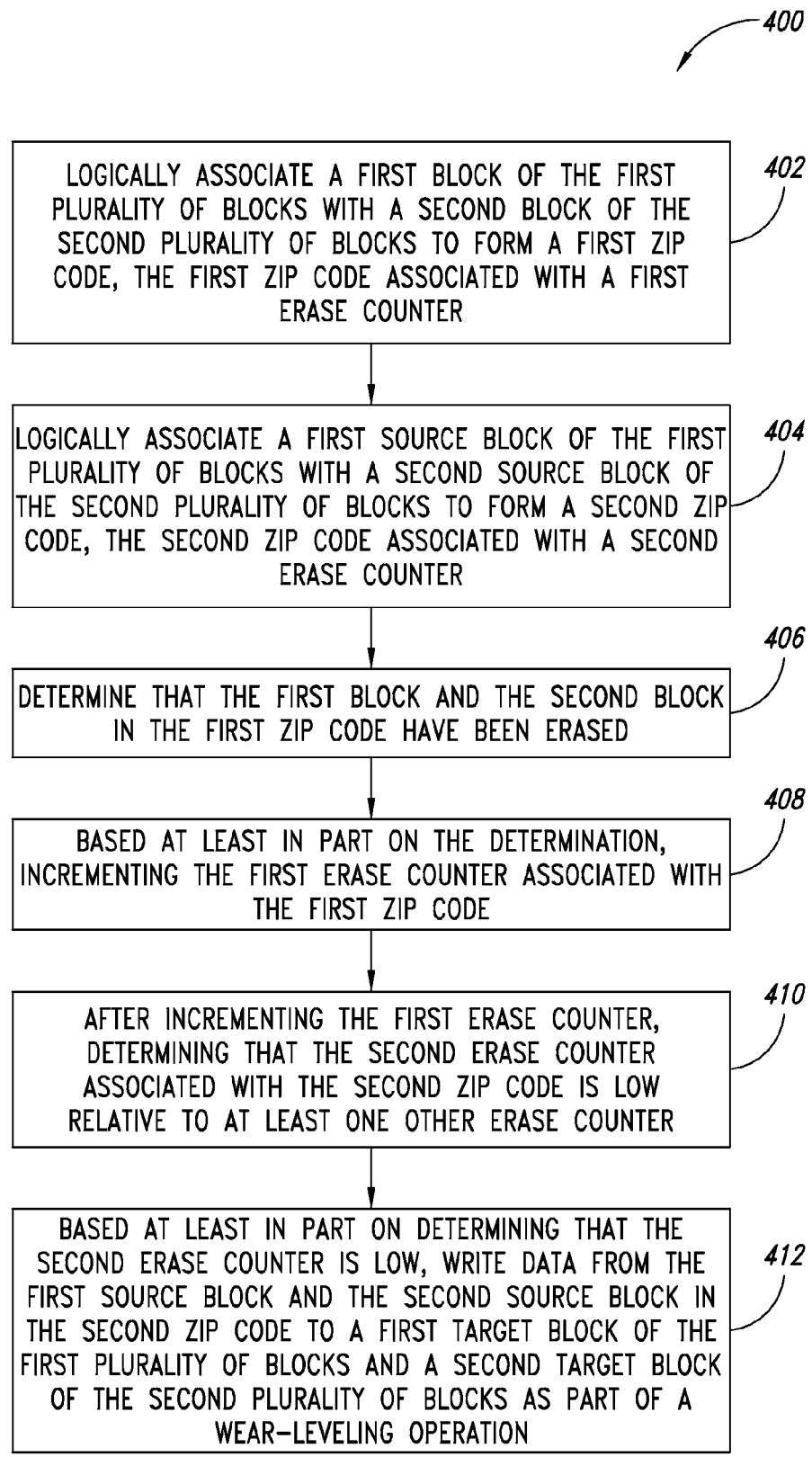
FIG. 4 is a flow chart illustrating one method of operating the solid state drive of FIG. 1, according to one illustrated embodiment.

FIG. 4 illustrates a flow diagram for a method 400 of operating a solid state drive, according to one embodiment. The method 400 will be discussed in the context of the SSD 1 of FIG. 1. As described above, the SSD 1 may include a first flash memory device 2a logically divided into a first plurality of blocks 6, each of the first plurality of blocks 6 being logically divided into addressable pages 8. The SSD 1 may further include a second flash memory device 2b logically divided into a second plurality of blocks 10, each of the second plurality of blocks 10 being logically divided into addressable pages 12. A memory controller 4 may be coupled to both the first flash memory device 2a and the second flash memory device 2b. In some embodiments, one or more of the acts described below may be performed by a processor 14 executing instructions stored in a memory 16. However, the acts disclosed herein may be executed in a variety of different SSDs, in accordance with the described method.

At act 402, a first block (e.g., block $6_0$) of the first plurality of blocks 6 is logically associated with a second block (e.g., block $10_0$) of the second plurality of blocks 10 to form a first zip code, the first zip code associated with a first erase counter. At act 404, a first source block (e.g., block $6_1$) of the first plurality of blocks 6 is logically associated with a second source block (e.g., block $10_1$) of the second plurality of blocks 10 to form a second zip code, the second zip code associated with a second erase counter. In one embodiment, as described above, the memory controller 4 may be configured to logically associate these respective blocks to form the zip codes. In other embodiments, a processor 14 of the SSD 1 may logically associate these blocks.

At act 406, it is determined that the first block $6_0$ and the second block $10_0$ have been erased. In one embodiment, the first and second blocks $6_0$, $10_0$ may have been erased as part of an erase operation associated with the entire first zip code. For example, the erase operation may be triggered once none of the pages in the first zip code is associated with a current LBA. The erase operation may be triggered by a command from a host computing device, or may be initiated internally by the SSD 1 without regards to commands from the host computing device. In one embodiment, the processor 14 of the SSD 1 may determine that the first and second blocks $6_0$, $10_0$ have been erased. In other embodiments, other circuitry within the SSD 1 (e.g., the memory controller 4) may make the determination.

At act 408, based at least in part on the determination, the first erase counter associated with the first zip code is incremented. The first erase counter may be used to track cumulative erase operations associated with the first zip code since the manufacture of the SSD 1. In one embodiment, the first erase counter may be stored in a non-volatile memory 18 of the SSD 1 and may be incremented based upon a command generated by the processor 14. In another embodiment, the memory controller 4 may manage erase counters associated with the zip codes and may cause the first erase counter to be incremented based at least in part on act 406.

At act 410, after incrementing the first erase counter, it is determined that the second erase counter associated with the second zip code is low relative to at least one other erase counter. In one embodiment, whenever an erase counter is incremented, the erase counters of all of the zip codes may be checked in order to determine whether there are any zip codes that have a relatively low erase counter. In other embodiments, only the erase counters of certain zip codes may be checked.

In one embodiment, in order to determine whether or not the second erase counter is relatively low, the second erase counter may be compared against the first erase counter. In another embodiment, the second erase counter may be compared against an average (e.g., a median, mean or mode) of two or more of the erase counters. In other embodiments, other algorithms for determining whether or not the second erase counter is relatively low may be employed.

At act 412, based at least in part on determining that the second erase counter is low, data from the first source block $6_1$ and the second source block $10_1$ in the second zip code is written to a first target block (e.g., block $6_2$) of the first plurality of blocks 6 and a second target block (e.g., block $10_2$) of the second plurality of blocks 10 as part of a wear-leveling operation. Thus, data from the second zip code may be moved to a target zip code including the target blocks $6_2$, $10_2$, as part of the wear-leveling operation. The target zip code may comprise any blocks of the first and second plurality of blocks 6, 10, and need not be adjacent the second zip code as illustrated. In other embodiments, data from the second zip code may be moved to blocks associated with multiple zip codes.

In one embodiment, based at least in part on determining that the second erase counter is low, a header may be written to the first flash memory device 2a, the header including information indicative of the first source block $6_1$, the second source block $10_1$, the first target block $6_2$, and the second target block $10_2$. The header may be associated with a single wear-leveling operation and may include a variety of information associated with that wear-leveling operation. In one embodiment, the header may be formatted similarly to the header 220, discussed above with reference to FIG. 2.

In one embodiment, the header may be written to a block in a "warehouse" zip code maintained by the memory controller 4. Indeed, the header may be written to multiple blocks within the warehouse zip code. For example, multiple, duplicate headers may be written to different ones of the flash memory devices 2 in blocks comprising the warehouse zip code.

The wear-leveling operation may then be suspended before it has been completed. Any of a number of events may trigger such suspension. In one embodiment, for example, a host command may be received by the SSD 1, and the wear-leveling operation may be suspended in order to respond appropriately to the host command. In another embodiment, a request to normally shut-down the SSD 1 may be received, and the wear-leveling operation may be suspended. In other embodiments, other events may interrupt the wear-leveling operation.

Based at least in part on suspending the wear-leveling operation, a footer may be written to at least one of the first flash memory device 2a and the second flash memory device 2b, the footer including information indicative of progress made on the wear-leveling operation prior to the suspension. In one embodiment, the footer may be associated with a single wear-leveling operation and may include a variety of information associated with that wear-leveling operation. For example, the footer may be formatted similarly to the footer 222, discussed above with reference to FIG. 2.

In one embodiment, the footer may be written to a block within the warehouse zip code; the block may be the same as or different than the block to which the header has been written. In other embodiments, the footer, like the header, may be written one or more times to the warehouse zip code (e.g., to different flash memory devices 2).

In one embodiment, information indicative of current locations on the first flash memory device 2a and the second flash memory device 2b in which the header and the footer are written may be stored in the NVM 18. As described above, these current locations may comprise at least one warehouse zip code. Thus, the processor 14 may be able to quickly determine the location of the current warehouse zip code by consulting the NVM 18.

In one embodiment, data from the first source block $6_1$ and the second source block $10_1$ of the second zip code may be read to a volatile memory buffer (e.g., in the computer-readable memory 16) before writing the header. After writing the header, a first page (e.g., page $8_0$) of the first source block $6_1$ may be written to the first target block $6_2$, and a second page (e.g., page $8_0$) of the second source block $10_1$ may be written to the second target block $10_2$. In one embodiment, both of these pages may be written substantially concurrently to the first and second memory devices 2a, 2b from the volatile memory buffer. After writing the first page $8_0$ of the first source block $6_1$ and the second page $8_0$ of the second source block $10_1$, it may be determined if the wear-leveling operation is complete and if the wear-leveling operation should be suspended. If neither is true, then a third page (e.g., page $8_1$) of the first source block $6_1$ may be written to the first target block $6_2$, and a fourth page (e.g., page $8_1$) of the second source block $10_1$ may be written to the second target block $10_2$. This sequence of (1) writing one page to each block of the target zip code, (2) determining if the wear-leveling operation is complete and if the wear-leveling operation should be suspended, and then (3) writing another page may be continued until all of the pages from the second zip code have been written to the target zip code. Of course, in other embodiments, pages from the second zip code may be written to the target blocks $6_2$, $10_2$ in a different order, or may be written sequentially to the target blocks $6_2$, $10_2$ rather than in parallel.

In yet another embodiment, the first flash memory device 2a and the second flash memory device 2b may support internal data copies. In such an embodiment, rather than copying data from the source blocks $6_1$, $10_1$ to a volatile memory buffer before copying it back to the target blocks $6_2$, $10_2$, the processor 14 may cause the flash memory devices 2a, 2b to copy pages from the source blocks $6_1$, $10_1$ to the target blocks $6_2$, $10_2$. For example, after writing a header associated with the wear-leveling operation, the processor 14 may cause the first flash memory device 2a to copy a first page (e.g., page $8_0$) of the first source block $6_1$ to the first target block $6_2$, and may cause the second flash memory device 2b to copy a second page (e.g., page $8_0$) of the second source block $10_1$ to the second target block $10_2$. In one embodiment, both of these pages may be copied substantially concurrently by the first and second memory devices 2a, 2b. After causing the first flash memory device 2a and the second flash memory device 2b to copy the first page $8_0$ of the first source block $6_1$ and the second page $8_0$ of the second source block $10_1$, it may be determined if the wear-leveling operation is complete and if the wear-leveling operation should be suspended. If neither is true, then the processor 14 may cause the first flash memory device 2a to copy a third page (e.g., page $8_1$) of the first source block $6_1$ to the first target block $6_2$, and may cause the second flash memory device 2b to copy a fourth page (e.g., page $8_1$) of the second source block $10_1$ to the second target block $10_2$. This sequence of (1) copying one page to each block of the target zip code, (2) determining if the wear-leveling operation is complete and if the wear-leveling operation should be suspended, and then (3) copying another page may be continued until all of the pages from the second zip code have been copied to the target zip code. Of course, in other embodiments, the pages may be copied to the target blocks $6_2$, $10_2$ in a different order. Although discussed above in terms of the processor 14, it may be understood that other circuitry within the SSD 1 (e.g., the memory controller 4) may cause the flash memory devices 2a, 2b to copy pages.

When the wear-leveling operation is complete, a completion footer including information indicative of completion of the wear-leveling operation may be written, and the first source block $6_1$ and the second source block $10_1$ may be erased. The wear-leveling operation may be considered complete when all of the pages from the second zip code have been written to the target zip code. In one embodiment, the PBA-LBA mapping information previously associated with the second zip code may then be modified to refer to the target zip code. The completion footer may be written to the warehouse zip code and, in one embodiment, may replace any previous footers associated with the wear-leveling operation. In some embodiments, the entire second zip code may be erased upon completion of the wear-leveling operation and may thus be made available for subsequent write commands received from a host computing device.

In one embodiment, the wear-leveling operation may be suspended, and the SSD 1 may subsequently be turned off (e.g., during a normal shutdown, or in a power loss situation). After the SSD 1 is powered up, the footer may be read to determine the progress made on the wear-leveling operation prior to the suspension. The processor 14 may locate the footer, for example, by accessing the most recent location information stored in the NVM 18. In one embodiment, upon finding a footer within a current warehouse zip code, the processor 14 may verify the information in the footer. For example, the processor 14 may check error codes associated with the footer, and may also compare different copies of the footer within the warehouse zip code to verify that the information in the footer is correct.

If the footer is a completion footer indicating that the wear-leveling operation was properly completed, then the processor 14 may begin normal operation. If the footer does not indicate that the wear-leveling operation was completed, then the wear-leveling operation may be resumed based at least in part on the footer. For example, once the footer has been found and verified, the processor 14 may access the header associated with the footer, and the header may be read to identify the first source block $6_1$, the second source block $10_1$, the first target block $6_2$, and the second target block $10_2$. In one embodiment, upon finding a header within the current warehouse zip code, the processor 14 may verify the information in the header (as with the footer). For example, the processor 14 may check error codes associated with the header, and may also compare different copies of the header within the warehouse zip code to verify that the information in the header is correct. The wear-leveling operation may then be resumed based at least in part on the footer and the header. The wear-leveling operation need not be resumed immediately. For example, in one embodiment, information indicative of the wear-leveling operation may simply be passed to a scheduler module, such that the wear-leveling operation may be resumed at a later time. The header may be used to determine information regarding the source and target blocks of the wear-leveling operation, while the footer may include information indicative of the progress made on the wear-leveling operation prior to the suspension. In one embodiment, for example, the footer may include information indicative of the pages most recently written to the target zip code, and the wear-leveling operation may be resumed by moving the pages succeeding those pages.

In one embodiment, after the SSD 1 is powered up, the processor 14 may search for footers including information indicative of progress made on wear-leveling operations. If no footer is found (or if no verifiable footer is found), then the processor 14 may search for headers including information indicative of source blocks and target blocks associated with wear-leveling operations. If a header associated with the wear-leveling operation discussed above is found but no corresponding footer, then this may indicate that power was removed unexpectedly. Since no footer was written, corruption in the partially programmed target blocks is unknown. Thus, in one embodiment, any partially programmed target blocks associated with the header may be erased, and a completion footer including information indicative of completion of the wear-leveling operation may be written. The wear-leveling operation for the second zip code may then be re-scheduled based at least in part on the header. For example, in one embodiment, the wear-leveling operation may be added to a queue of wear-leveling operations maintained by the firmware scheduler module.

Figure 5:
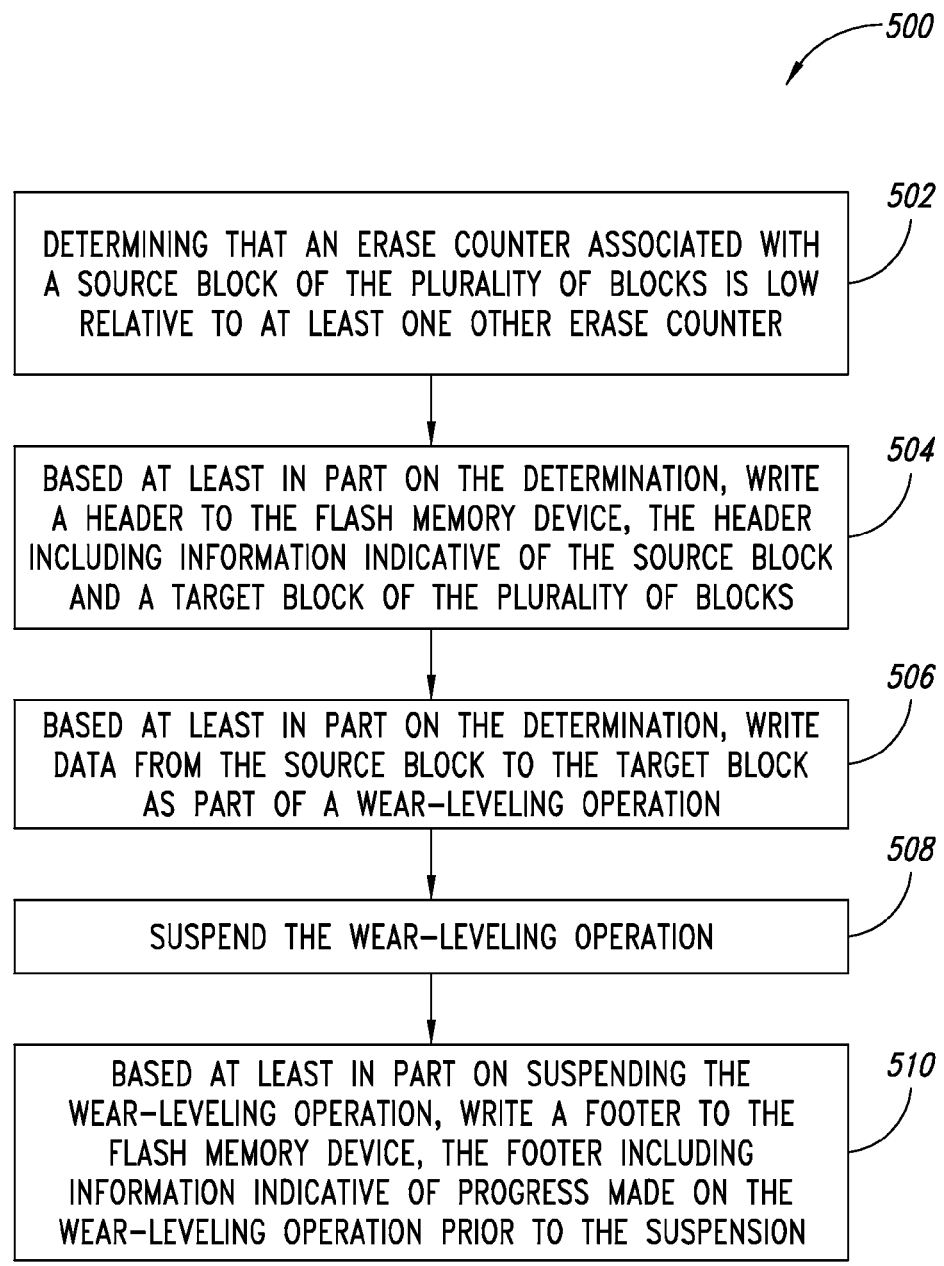
FIG. 5 is a flow chart illustrating one method of operating the solid state drive of FIG. 2, according to one illustrated embodiment.

FIG. 5 illustrates a flow diagram for a method 500 of operating a solid state drive, according to one embodiment. The method 500 will be discussed in the context of the SSD 201 of FIG. 2. As described above, the SSD 201 may include a flash memory device 202 logically divided into a plurality of blocks 206, each of the plurality of blocks 206 being logically divided into addressable pages 208. The SSD 201 may further include a memory controller 204 coupled to the flash memory device 202. In some embodiments, one or more of the acts described below may be performed by a processor 214 executing instructions stored in a memory 216. However, the acts disclosed herein may be executed in a variety of different SSDs, in accordance with the described method.

At act 502, it is determined that an erase counter associated with a source block (e.g., block $206_0$) of the plurality of blocks 206 is low relative to at least one other erase counter. In one embodiment, for example, when an erase counter is incremented, the erase counters of all of the source blocks 206 may be checked in order to determine whether there are any source blocks associated with relatively low erase counters. In order to determine whether the erase counter is relatively low, the erase counter may be compared against at least one other erase counter. For example, the erase counter may be compared against an average (e.g., a median, mean or mode) of two or more of the erase counters.

At act 504, based at least in part on determining that the erase counter is low, a header 220 may be written to the flash memory device 202, the header 220 including information indicative of the source block $206_0$ and a target block $206_1$ of the plurality of blocks 206. The header 220 may include a variety of information associated with the wear-leveling operation, as described above. In one embodiment, the header 220 may be written to a warehouse block of the plurality of blocks 206.

At act 506, based at least in part on determining that the erase counter is low, data from the source block $206_0$ is written to the target block $206_1$ as part of a wear-leveling operation. A variety of different wear-leveling algorithms for moving data from the source block $206_0$ to the target block $206_1$ may be implemented.

At act 508, the wear-leveling operation may be suspended. In one embodiment, for example, a host command may be received by the SSD 201, and the wear-leveling operation may be suspended in order to respond appropriately to the host command. In another embodiment, a request to normally shut-down the SSD 201 may be received, and the wear-leveling operation may be suspended.

At act 510, based at least in part on suspending the wear-leveling operation, a footer 222 may be written to the flash memory device 202, the footer 222 including information indicative of progress made on the wear-leveling operation prior to the suspension. In one embodiment, the footer 222 may be written to a warehouse block, which may be the same as or different than the warehouse block to which the header 220 is written.

The other wear-leveling operations and associated header/footer operations described above with reference to method 400 may also be performed in accordance with method 500, with corresponding changes to account for the different structures of the SSD 1 and the SSD 201.

Figure 6:
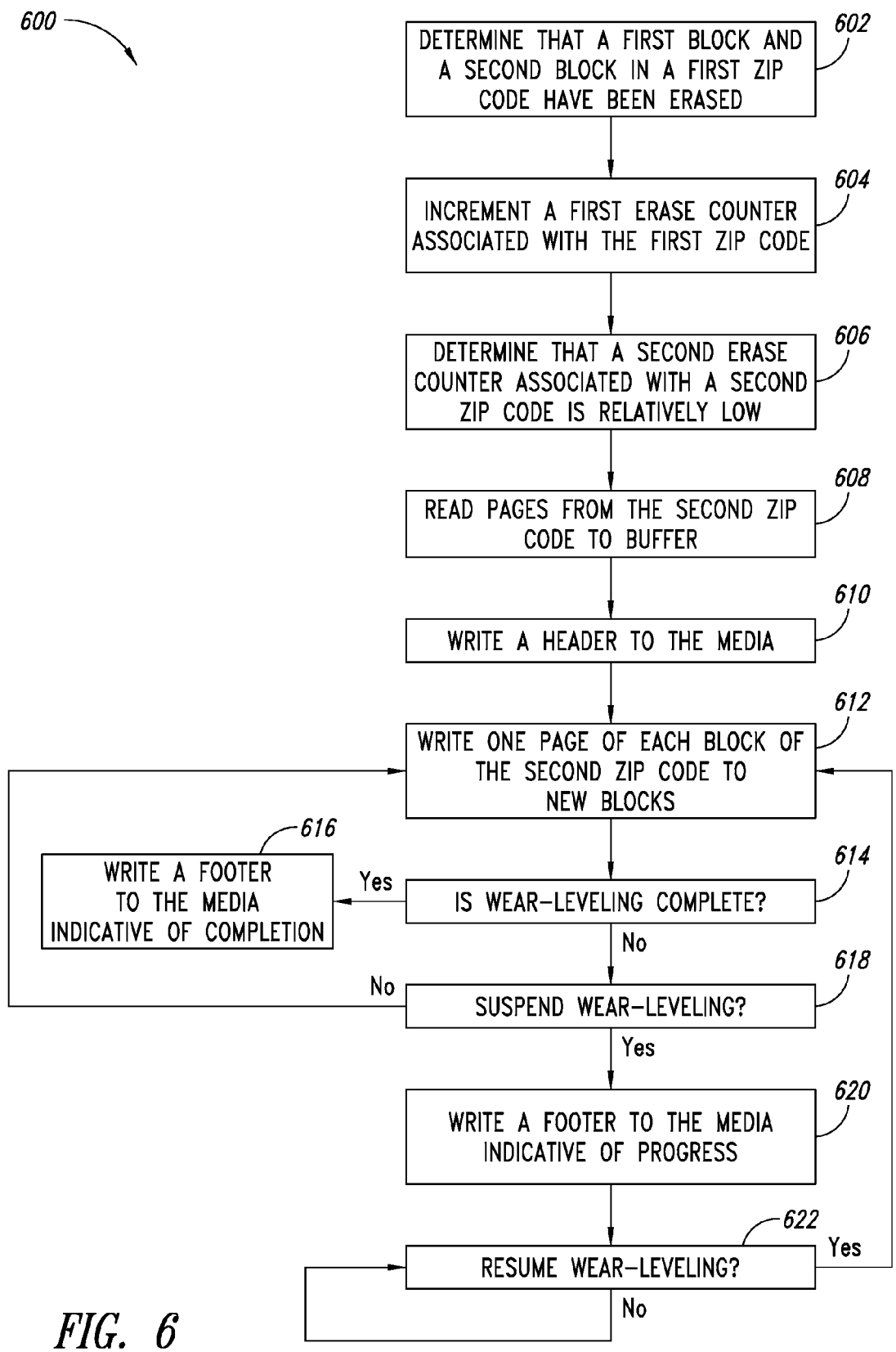
FIG. 6 is a detailed flow chart illustrating one method of performing a wear-leveling operation, according to one illustrated embodiment.

FIG. 6 is a still more detailed flow chart illustrating one example method 600 of performing a wear-leveling operation. This method 600 will be discussed briefly in the context of the SSD 1 of FIG. 1. However, the acts disclosed herein may be executed in a variety of different SSDs (e.g., in the SSD 201 or 301) in accordance with the described method.

At act 602, it is determined that a first block (e.g., block $6_0$) and a second block (e.g., block $10_0$) in a first zip code have been erased. At act 604, a first erase counter associated with the first zip code is incremented, and, at act 606, it is determined that a second erase counter associated with a second zip code is relatively low. This second zip code may, for example, include first and second source blocks $6_1$, $10_1$. At act 608, pages from the second zip code are then read to a buffer. For example, in one embodiment, all of the pages 8 of the blocks $6_1$, $10_1$ comprising the second zip code may be read to a buffer of the memory 16 as part of a wear-leveling operation.

At act 610, a header is written to the media. In one embodiment, the header may be written to one or more of the flash memory devices 2a, 2b, as soon as the pages 8 have been read to the buffer. At act 612, one page 8 of each block $6_1$, $10_1$ of the second zip code is written to new blocks (e.g., to first and second target blocks $6_2$, $10_2$). In one embodiment, for example, one page 8 from each of the first and second source blocks $6_1$, $10_1$ may be written from the memory 16 to the corresponding target blocks $6_2$, $10_2$. At act 614, the SSD 1 determines if wear-leveling is complete (i.e., if there are no additional pages from the source blocks $6_1$, $10_1$ left to be written to the target blocks $6_2$, $10_2$). If the wear-leveling operation is complete, then a completion footer is written to the media indicative of completion at act 616.

At act 618, if the wear-leveling operation is not complete, then the SSD 1 determines if wear-leveling should be suspended. If the wear-leveling operation should not be suspended, then another page 8 of each source block $6_1$, $10_1$ of the second zip code is written to the target blocks $6_2$, $10_2$ at act 612. If the wear-leveling operation should be suspended, then, at act 620, a footer is written to the media indicative of progress made on the wear-leveling operation. At a later time, the wear-leveling operation may be resumed at act 622, and the pages 8 may continue to be written to the target blocks $6_2$, $10_2$ in accordance with act 612.

Figure 7:
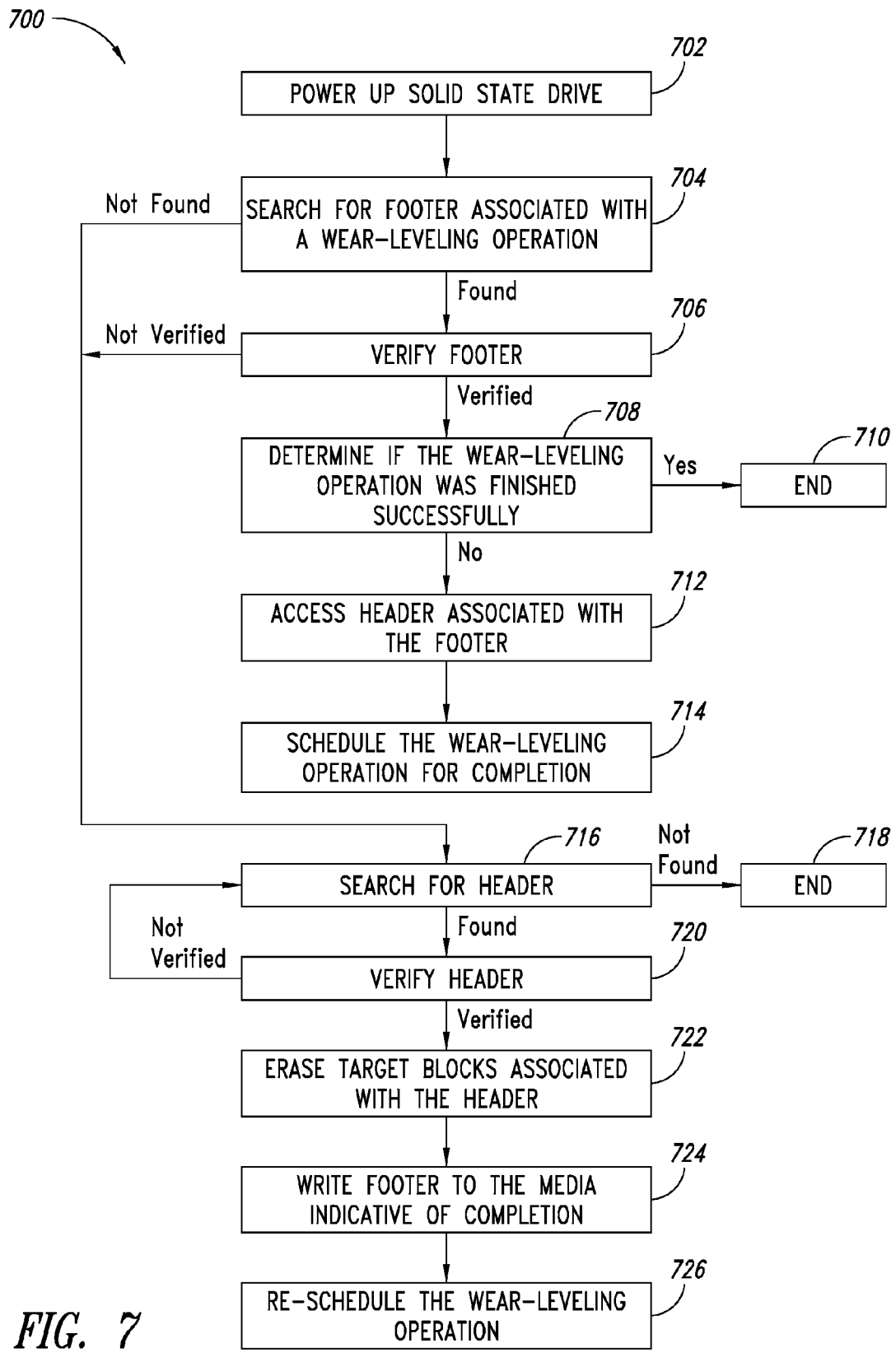
FIG. 7 is a detailed flow chart illustrating one method of powering up and determining whether or not to resume a wear-leveling operation, according to one illustrated embodiment.

FIG. 7 is a more detailed flow chart illustrating one method 700 of powering up and determining whether or not to resume or re-schedule a wear-leveling operation. This method 700 will be discussed briefly in the context of the SSD 1 of FIG. 1. However, the acts disclosed herein may be executed in a variety of different SSDs (e.g., in the SSD 201 or 301) in accordance with the described method.

At act 702, the SSD 1 is powered up. It may be powered up after an inadvertent or controlled shutdown. At act 704, the SSD 1 searches for a footer associated with a wear-leveling operation. In one embodiment, the processor 14 may consult the NVM 18, find the physical addresses for the current warehouse zip code and search within that warehouse zip code for footers. If a footer is found, then the footer may be verified at act 706, as described above. If the footer is verified, then it may be determined if the wear-leveling operation was completed successfully at act 708. If the wear-leveling operation was completed successfully, then the method 700 may end at act 710, and the SSD 1 may continue with normal operation.

If the footer indicates that the wear-leveling operation was not completed successfully, then the header associated with the footer may be accessed at act 712. The wear-leveling operation may then be scheduled for completion at act 714. In one embodiment, for example, the wear-leveling operation may be registered with a firmware scheduler module.

If no footer is found (or no footer is verified), then the SSD 1 may search for a header at act 716. At act 718, if no header is found, the method 700 may end, and the SSD 1 may continue with normal operation. If a header is found but not verified at act 720, then the search for a valid header may continue until one is found and verified. Once a valid header is found, then any partially programmed target blocks associated with the header are erased at act 722. At act 724, a footer is written to the media (e.g., to the warehouse zip code) indicative of completion of the prior wear-leveling operation. The wear-leveling operation may then be re-scheduled at act 726.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

I claim:

1. A solid state drive comprising:
a first flash memory device logically divided into a first plurality of blocks, each of the first plurality of blocks being logically divided into addressable pages;
a second flash memory device logically divided into a second plurality of blocks, each of the second plurality of blocks being logically divided into addressable pages;
a memory controller coupled to the first flash memory device and the second flash memory device, the memory controller configured to logically associate a first block of the first plurality of blocks with a second block of the second plurality of blocks to form a first zip code, the first zip code associated with a first erase counter, and configured to logically associate a first source block of the first plurality of blocks with a second source block of the second plurality of blocks to form a second zip code, the second zip code associated with a second erase counter;
a processor coupled to the memory controller and operable to execute instructions; and
a computer-readable memory having instructions stored thereon that are executable by the processor in order to cause the processor to perform a wear-leveling operation, by:
determining that the first block and the second block in the first zip code have been erased;
based at least in part on the determination, incrementing the first erase counter associated with the first zip code;
after incrementing the first erase counter, determining that the second erase counter associated with the second zip code is low relative to at least one other erase counter; and
based at least in part on determining that the second erase counter is low, writing data from the first source block and the second source block in the second zip code to a first target block of the first plurality of blocks and a second target block of the second plurality of blocks as part of the wear-leveling operation.

2. The solid state drive of claim 1, wherein the computer-readable memory has further instructions stored thereon that are executable by the processor in order to cause the processor to perform the wear-leveling operation, by:
writing a header to the first flash memory device, the header including information indicative of the first source block, the second source block, the first target block, and the second target block;
suspending the wear-leveling operation; and
based at least in part on suspending the wear-leveling operation, writing a footer to at least one of the first flash memory device and the second flash memory device, the footer including information indicative of progress made on the wear-leveling operation prior to the suspension.

3. The solid state drive of claim 2, wherein the computer-readable memory has further instructions stored thereon that are executable by the processor in order to cause the processor to perform the wear-leveling operation, by:
storing information indicative of current locations on the first flash memory device and the second flash memory device in which the header and the footer are written in a non-volatile memory separate from the first flash memory device and the second flash memory device, the current locations comprising at least one warehouse zip code.

4. The solid state drive of claim 2, wherein the computer-readable memory has further instructions stored thereon that are executable by the processor in order to cause the processor to perform the wear-leveling operation, by:
  reading the data from the first source block and the second source block to a volatile memory buffer before writing the header.

5. The solid state drive of claim 2, wherein writing the data from the first source block and the second source block in the second zip code to the first target block and the second target block comprises:
  after writing the header, writing a first page of the first source block to the first target block and writing a second page of the second source block to the second target block;
  after writing the first page and the second page, determining if the wear-leveling operation is complete and determining if the wear-leveling operation should be suspended; and
  if the wear-leveling operation is not complete and should not be suspended, writing a third page of the first source block to the first target block and writing a fourth page of the second source block to the second target block.

6. The solid state drive of claim 5, wherein the computer-readable memory has further instructions stored thereon that are executable by the processor in order to cause the processor to perform the wear-leveling operation, by:
  if the wear-leveling operation is complete, writing a completion footer including information indicative of completion of the wear-leveling operation and erasing the first source block and the second source block.

7. The solid state drive of claim 2, wherein the computer-readable memory has further instructions stored thereon that are executable by the processor in order to cause the processor to perform the wear-leveling operation, by:
  after a powering-up of the solid state drive, reading the footer to determine the progress made on the wear-leveling operation prior to the suspension; and
  resuming the wear-leveling operation based at least in part on the footer.

8. The solid state drive of claim 7, wherein the computer-readable memory has further instructions stored thereon that are executable by the processor in order to cause the processor to perform the wear-leveling operation, by, after reading the footer:
  accessing the header associated with the footer;
  reading the header to identify the first source block, the second source block, the first target block, and the second target block; and
  resuming the wear-leveling operation based at least in part on the footer and the header.

9. The solid state drive of claim 2, wherein the first flash memory device and the second flash memory device support internal data copies, and wherein writing the data from the first source block and the second source block in the second zip code to the first target block and the second target block comprises:
  after writing the header, causing the first flash memory device to copy a first page of the first source block to the first target block and causing the second flash memory device to copy a second page of the second source block to the second target block;
  after causing the first flash memory device and the second flash memory device to copy the first page and the second page, respectively, determining if the wear-leveling operation is complete and determining if the wear-leveling operation should be suspended; and
  if the wear-leveling operation is not complete and should not be suspended, causing the first flash memory device to copy a third page of the first source block to the first target block and causing the second flash memory device to copy a fourth page of the second source block to the second target block.

10. The solid state drive of claim 1, wherein the computer-readable memory has further instructions stored thereon that are executable by the processor in order to cause the processor to perform the wear-leveling operation, by:
  after a powering-up of the solid state drive, searching for footers including information indicative of progress made on wear-leveling operations;
  if no footer is found, searching for headers including information indicative of source blocks and target blocks associated with wear-leveling operations; and
  if a header associated with the wear-leveling operation is found, erasing any partially programmed target blocks associated with the header, and writing a completion footer including information indicative of completion of the wear-leveling operation; and
  re-scheduling the wear-leveling operation based at least in part on the header.

11. A solid state drive comprising:
  a flash memory device logically divided into a plurality of blocks, each of the plurality of blocks being logically divided into addressable pages;
  a memory controller coupled to the flash memory device;
  a processor coupled to the memory controller and operable to execute instructions; and
  a computer-readable memory having instructions stored thereon that are executable by the processor in order to cause the processor to perform a wear-leveling operation, by:
    determining that an erase counter associated with a source block of the plurality of blocks is low relative to at least one other erase counter;
    based at least in part on the determination, writing a header to the flash memory device, the header including information indicative of the source block and a target block of the plurality of blocks;
    based at least in part on the determination, writing data from the source block to the target block as part of the wear-leveling operation;
    suspending the wear-leveling operation; and
    based at least in part on suspending the wear-leveling operation, writing a footer to the flash memory device, the footer including information indicative of progress made on the wear-leveling operation prior to the suspension.

12. The solid state drive of claim 11, wherein writing the data from the source block to the target block comprises:
  after writing the header, writing a first page of the source block to the target block;
  after writing the first page, determining if the wear-leveling operation is complete and determining if the wear-leveling operation should be suspended; and
  if the wear-leveling operation is not complete and should not be suspended, writing a second page of the source block to the target block.

13. The solid state drive of claim 12, wherein the computer-readable memory has further instructions stored thereon that are executable by the processor in order to cause the processor to perform the wear-leveling operation, by:
  if the wear-leveling operation is complete, writing a completion footer to the flash memory device, the completion footer including information indicative of completion of the wear-leveling operation and erasing the source block.

14. The solid state drive of claim 11, wherein the computer-readable memory has further instructions stored thereon that are executable by the processor in order to cause the processor to perform the wear-leveling operation, by:
    after a powering-up of the solid state drive, reading the footer to determine the progress made on the wear-leveling operation prior to the suspension; and
    resuming the wear-leveling operation based at least in part on the footer.

15. The solid state drive of claim 14, wherein the computer-readable memory has further instructions stored thereon that are executable by the processor in order to cause the processor to perform the wear-leveling operation, by:
    accessing the header associated with the footer;
    reading the header to identify the source block and the target block; and
    resuming the wear-leveling operation based at least in part on the footer and the header.

16. The solid state drive of claim 11, wherein the computer-readable memory has further instructions stored thereon that are executable by the processor in order to cause the processor to perform the wear-leveling operation, by:
    after a powering-up of the solid state drive, searching for footers including information indicative of progress made on wear-leveling operations;
    if no footer is found, searching for headers including information indicative of source blocks and target blocks associated with wear-leveling operations;
    if the header is found, erasing any partially programmed target blocks associated with the header, and writing a completion footer including information indicative of completion of the wear-leveling operation before re-scheduling the wear-leveling operation; and
    re-scheduling the wear-leveling operation based at least in part on the header.

17. The solid state drive of claim 11, wherein the computer-readable memory has further instructions stored thereon that are executable by the processor in order to cause the processor to perform the wear-leveling operation, by:
    storing information indicative of current locations on the flash memory device in which the header and the footer are written in a non-volatile memory separate from the flash memory device.

18. A method of operating a solid state drive having a first flash memory device logically divided into a first plurality of blocks, each of the first plurality of blocks being logically divided into addressable pages, a second flash memory device logically divided into a second plurality of blocks, each of the second plurality of blocks being logically divided into addressable pages, and a memory controller coupled to the first flash memory device and to the second flash memory device, the method comprising:
    logically associating a first block of the first plurality of blocks with a second block of the second plurality of blocks to form a first zip code, the first zip code associated with a first erase counter;
    logically associating a first source block of the first plurality of blocks with a second source block of the second plurality of blocks to form a second zip code, the second zip code associated with a second erase counter;
    determining that the first block and the second block in the first zip code have been erased;
    based at least in part on the determination, incrementing the first erase counter associated with the first zip code;
    after incrementing the first erase counter, determining that the second erase counter associated with the second zip code is low relative to at least one other erase counter; and
    based at least in part on determining that the second erase counter is low, writing data from the first source block and the second source block in the second zip code to a first target block of the first plurality of blocks and a second target block of the second plurality of blocks as part of a wear-leveling operation.

19. The method of claim 18, further comprising:
    writing a header to the first flash memory device, the header including information indicative of the first source block, the second source block, the first target block, and the second target block;
    suspending the wear-leveling operation; and
    based at least in part on suspending the wear-leveling operation, writing a footer to at least one of the first flash memory device and the second flash memory device, the footer including information indicative of progress made on the wear-leveling operation prior to the suspension.

20. The method of claim 19, further comprising:
    storing information indicative of current locations on the first flash memory device and the second flash memory device in which the header and the footer are written in a non-volatile memory separate from the first flash memory device and the second flash memory device, the current locations comprising at least one warehouse zip code.

21. The method of claim 19, further comprising:
    reading the data from the first source block and the second source block to a volatile memory buffer before writing the header.

22. The method of claim 19, wherein writing the data from the first source block and the second source block in the second zip code to the first target block and the second target block comprises:
    after writing the header, writing a first page of the first source block to the first target block and writing a second page of the second source block to the second target block;
    after writing the first page and the second page, determining if the wear-leveling operation is complete and determining if the wear-leveling operation should be suspended; and
    if the wear-leveling operation is not complete and should not be suspended, writing a third page of the first source block to the first target block and writing a fourth page of the second source block to the second target block.

23. The method of claim 22, further comprising:
    if the wear-leveling operation is complete, writing a completion footer including information indicative of completion of the wear-leveling operation and erasing the first source block and the second source block.

24. The method of claim 19, further comprising:
    after a powering-up of the solid state drive, reading the footer to determine the progress made on the wear-leveling operation prior to the suspension; and
    resuming the wear-leveling operation based at least in part on the footer.

25. The method of claim 24, further comprising:
    accessing the header associated with the footer;
    reading the header to identify the first source block, the second source block, the first target block, and the second target block; and resuming the wear-leveling operation based at least in part on the footer and the header.

26. The method of claim 19, wherein the first flash memory device and the second flash memory device support internal data copies, and wherein writing the data from the first source block and the second source block in the second zip code to the first target block and the second target block comprises:
   after writing the header, causing the first flash memory device to copy a first page of the first source block to the first target block and causing the second flash memory device to copy a second page of the second source block to the second target block;
   after causing the first flash memory device and the second flash memory device to copy the first page and the second page, determining if the wear-leveling operation is complete and determining if the wear-leveling operation should be suspended; and
   if the wear-leveling operation is not complete and should not be suspended, causing the first flash memory device to copy a third page of the first source block to the first target block and causing the second flash memory device to copy a fourth page of the second source block to the second target block.

27. The method of claim 18, further comprising:
   after a powering-up of the solid state drive, searching for footers including information indicative of progress made on wear-leveling operations;
   if no footer is found, searching for headers including information indicative of source blocks and target blocks associated with wear-leveling operations;
   if a header associated with the wear-leveling operation is found, erasing any partially programmed target blocks associated with the header, and writing a completion footer including information indicative of completion of the wear-leveling operation; and
   re-scheduling the wear-leveling operation based at least in part on the header.

28. A method of operating a solid state drive having a flash memory device logically divided into a plurality of blocks, each of the plurality of blocks being logically divided into addressable pages, and a memory controller coupled to the flash memory device, the method comprising:
   determining that an erase counter associated with a source block of the plurality of blocks is low relative to at least one other erase counter;
   based at least in part on the determination, writing a header to the flash memory device, the header including information indicative of the source block and a target block of the plurality of blocks;
   based at least in part on the determination, writing data from the source block to the target block as part of a wear-leveling operation;
   suspending the wear-leveling operation; and
   based at least in part on suspending the wear-leveling operation, writing a footer to the flash memory device, the footer including information indicative of progress made on the wear-leveling operation prior to the suspension.

29. The method of claim 28, wherein writing the data from the source block to the target block comprises:
   after writing the header, writing a first page of the source block to the target block;
   after writing the first page, determining if the wear-leveling operation is complete and determining if the wear-leveling operation should be suspended; and
   if the wear-leveling operation is not complete and should not be suspended, writing a second page of the source block to the target block.

30. The method of claim 29, further comprising:
   if the wear-leveling operation is complete, writing a completion footer to the flash memory device, the completion footer including information indicative of completion of the wear-leveling operation and erasing the source block.

31. The method of claim 28, further comprising:
   after a powering-up of the solid state drive, reading the footer to determine the progress made on the wear-leveling operation prior to the suspension; and
   resuming the wear-leveling operation based at least in part on the footer.

32. The method of claim 31, further comprising:
   accessing the header associated with the footer;
   reading the header to identify the source block and the target block; and
   resuming the wear-leveling operation based at least in part on the footer and the header.

33. The method of claim 28, further comprising:
   after a powering-up of the solid state drive, searching for footers including information indicative of progress made on wear-leveling operations;
   if no footer is found, searching for headers including information indicative of source blocks and target blocks associated with wear-leveling operations;
   if the header is found, erasing any partially programmed target blocks associated with the header, and writing a completion footer including information indicative of completion of the wear-leveling operation; and
   re-scheduling the wear-leveling operation based at least in part on the header.

34. The method of claim 33, further comprising:
   storing information indicative of current locations on the flash memory device in which the header and the footer are written in a non-volatile memory separate from the flash memory device.

* * * * *